United States Patent
Lehmann

(10) Patent No.: US 6,185,987 B1
(45) Date of Patent: Feb. 13, 2001

(54) METHOD FOR TIGHTNESS TESTING OF CLOSED CONTAINERS, TEST CHAMBER, TEST SYSTEM, AND TESTER THEREFOR

(76) Inventor: Martin Lehmann, Obere Franbühlstr. 1, 5610 Wohlen (CH)

( * ) Notice: Under 35 U.S.C. 154(b), the term of this patent shall be extended for 0 days.

(21) Appl. No.: 09/391,252

(22) Filed: Sep. 7, 1999

Related U.S. Application Data

(62) Division of application No. 08/944,183, filed on Oct. 6, 1997, now Pat. No. 5,962,766.

(30) Foreign Application Priority Data

May 7, 1997 (EP) .................................................. 97107528

(51) Int. Cl.[7] ........................................................ G01M 3/16
(52) U.S. Cl. ............................................................. 73/49.3
(58) Field of Search .................................. 73/49.2, 49.3

(56) References Cited

U.S. PATENT DOCUMENTS

| | | | |
|---|---|---|---|
| 1,749,826 | 3/1930 | Lubach | 340/604 |
| 3,855,531 | 12/1974 | Fielibert et al. | 73/52 |
| 3,973,249 | 8/1976 | Yokote et al. | |
| 4,404,516 | 9/1983 | Johnson, Jr. | |
| 4,529,974 | 7/1985 | Tanaka et al. | 340/605 |
| 4,972,179 | 11/1990 | Akiba | 340/605 |
| 5,042,291 | * 8/1991 | Lehmann | 73/49.3 |
| 5,513,516 | 5/1996 | Stauffer | 73/49.2 |
| 5,915,270 | * 6/1999 | Lehmann | 73/49.2 |

FOREIGN PATENT DOCUMENTS

05991-A   3/1994 (WO).

* cited by examiner

*Primary Examiner*—Daniel S. Larkin
(74) *Attorney, Agent, or Firm*—Antonelli, Terry, Stout & Kraus, LLP

(57) ABSTRACT

In order to obtain a reliable idea of the state of tightness for tightness testing of containers filled with liquids in which a pressure differential $\Delta p$ is created between the interior of the container and its exterior, and also relative to the container wall in contact with the filling, an impedance measurement (7) is performed using measuring electrodes ($3a$, $3b$) on the exterior of container (1).

19 Claims, 3 Drawing Sheets

METHOD FOR TIGHTNESS TESTING OF CLOSED CONTAINERS, TEST CHAMBER, TEST SYSTEM, AND TESTER THEREFOR

REFERENCE TO RELATED APPLICATION

This application is a divisional application of U.S. Ser. No. 08/944,183, filed Oct. 6, 1997 and now U.S. Pat. No. 5,962,776, issued Oct. 5, 1999, which is hereby incorporated by reference. Reference is also made to U.S. application Ser. No. 08/944,471 of the same applicant filed at the same time as U.S. application Ser. No. 08/944,183.

FIELD OF THE INVENTION

The present invention relates to a method for producing liquid content-filled containers involving tightness testing of closed receptacles, at least partially filled with flowable filling, in which a pressure differential relative to the environment is produced between the receptacle interior and the receptacle environment, a test chamber which is closable in a vacuum-tight manner for practicing the method, as well as a test system with such a test chamber, and finally a tester with a plurality of the test systems.

BACKGROUND AND SUMMARY OF THE INVENTION

Tightness testing methods are known for closed containers in which a pressure differential relative to the environment is produced between the interior of the container and its surroundings, in a test chamber, by applying a suction source to the test chamber. Leaking containers are identified as follows: following application of a given pressure differential, a suction source required for the purpose is uncoupled from the test chamber and the change as a function of time in the pressure differential between the interior of the container and its environment is observed and/or recorded in basic fashion. This is accomplished for example by measuring the pressure values in the environment of the container at at least two points in time. Depending on the size of a leak, pressure equalization between the interior of the container and its environment proceeds faster or slower. Information on such a technique can be found for example in WO94/05991 of the same applicant as for the present application.

The claimed procedure, especially according to the abovementioned WO94/05991, makes it possible to detect extremely small leaks in containers. Problems arise when containers to be tested are filled at least partially with a flowable filling, especially with a leak between a liquid filling and the environment, and the effect of suction, if a leak is present, causes liquid filling to escape into the environment through the leak, in other words at the outside wall of the container. Because of the sealing action of the escaping liquid filling, a leak in a container wall area exposed to a fluid can only be detected, if at all, by measuring pressure for relatively long periods of time, which is highly disadvantageous especially when testing containers are arriving sequentially on a production line.

The goal of the present invention is therefore to propose a method of the species recited at the outset in which the disadvantages of the abovementioned pressure measurement test are eliminated. For this purpose, the said method according to the invention is characterized by the following: if, as in the case described above, liquid filling escapes to the exterior through a leak in the container wall because of the applied pressure differential, this is detected by an electrical impedance measurement as proposed by the invention.

The liquid filling escaping in the immediate vicinity of the outside wall of the container produces a change in the electrical impedance between at least one pair of impedance measuring electrodes applied in this area, and an impedance measurement makes it possible to detect the change in this impedance produced by the filling.

While it is appropriate in certain cases to determine the escape of the filling by measuring the electrical alternating voltage impedance, especially when testing containers with electrically insulating walls, like those with plastic walls, and fillings that are electrical conductors, it is proposed to perform DC and preferably low-voltage DC resistance measurement as impedance measurement, using for example DC voltages below 50 V.

Although in cases when very specific locations on the container/receptacle under test are to be tested for leaks, a single impedance-measurement location in the vicinity of the container section to be tested may suffice, it is also proposed to provide a plurality of impedance measurement sections connected in parallel and to arrange these along the container to be tested in order to detect leaks anywhere in the container.

This tightness testing method based on impedance measurement can now be combined according to the invention in a highly advantageous manner with the abovementioned pressure measurement test. Namely, when containers are to be tested which, as is usually the case, are only partially filled with flowable filling, so that basically there are air inclusions in the container in addition to the liquid filling, it is never certain where the air is located in the container and where the liquid is located. The fact that in addition to impedance measurement for differentiating between tightness and leakiness, the time curve of a pressure differential is recorded especially by tracking the pressure in an encapsulated container environment, regardless of whether air inclusions are present or where said inclusions are located at the moment in the container, whereby a combined determination of the leakage state of a container can be obtained: at those parts of the container wall currently exposed to the filling, the electrical impedance measurement is representative of leakage, while as far as the wall parts that are currently in contact with air inclusions are concerned, the pressure differential that is recorded is representative of leakage. Here again, the known highly precise technique from WO94/05991 is used to distinguish between tightness and leakiness on the basis of the pressure differential that develops, wherein, after establishing a predetermined vacuum between the interior of the container and the encapsulated environment and after disconnecting the system from a vacuum source, the pressure in the encapsulated environment is recorded at at least two points in time and the pressure differential is evaluated as an indication of tightness. To create an extremely sensitive measurement method, at the first point in time, with the recorded pressure value stored as a reference signal, a zero-deviation signal is also measured and at the second point in time the pressure differential is recorded relative to the zero-corrected value for the first point in time. This makes it possible to amplify the abovementioned differential or the evaluation signal corresponding to this differential in order to achieve high resolution.

It is highly advantageous in this connection to evaluate a signal indicating the existence of an impedance differential by using the same method as for evaluating any pressure differential that develops.

A test chamber according to the invention for tightness testing of closed containers with flowable filling, comprises a test chamber closable in a vacuum-tight manner, at least one impedance-measuring section being provided in the test chamber. The impedance-measuring section has at least one pair of spaced electrodes. In a disclosed embodiment, a plurality of distributed electrode pairs is provided in the test chamber. The pairs are, preferably, connected in parallel. In one form of the invention, the chamber inside wall is formed by a pattern of electrically conducting electrode sections and insulating sections separating the electrode sections from one another. A further feature of the invention involves providing at least one pressure sensor on the test chamber. There is also at least one cleaning gas connection terminating in the chamber.

A test system with at least one such test chamber is defined according to the invention with at least one electrode pair of the test chamber being effectively connected with an impedance measuring unit. In one embodiment, the impedance-measuring unit is a DC resistance measuring unit, preferably a low-voltage resistance measuring unit. The distinction between non-leaking and leaking is made using a threshold-value-sensitive unit on an evaluation unit. The at least one test chamber has a plurality of electrode pairs which are connected effectively in parallel with the input impedance-measuring unit. The impedance-measuring unit comprises a threshold-value-sensitive unit on the output side.

The test system further comprises a pressure sensor on the test chamber. The output of the pressure sensor is actively connected with an evaluation unit that preferably records the output signal at a first point in time and also at a second subsequent point in time, and feeds the recorded pressure sensor output signals to a differential unit whose output acts on the threshold value-sensitive unit. The two inputs of the differential unit receive the output signal of the sensor recorded at the first point in time and a zero-differential signal is formed and stored as the output signal of the differential unit. Both the pressure sensor and electrode pair are effectively connected with the same evaluation unit which, preferably switchably, generates a signal as a function of the impedance at the electrode pair and the sensor output signal.

A highly advantageous design of this test system is achieved by virtue of the fact that in the most preferred version, with both an impedance measurement and a pressure measurement, one and the same evaluation unit is used. For example, if a DC voltage is applied across a measuring resistance and the voltage across the measuring resistance is evaluated as the measurement signal for impedance measurement in the section between the preferably several electrode sections connected in parallel, the evaluation unit is supplied with a voltage, namely the voltage that depends on the fixed measuring resistance and the current that varies with the measurement section resistance. The evaluation unit itself is then a voltage-measuring device. By switching to a pressure-measuring sensor provided on the test chamber, this same evaluation unit can be used to measure pressure-dependent sensor output voltage.

A tester of the type according to the invention comprises a plurality of the testing systems. A central impedance-measuring unit is provided for the testing systems. The unit is switchable to individual testing systems. A central evaluation unit is effectively connectable in a switchable fashion with pressure sensors of the test chambers of the test systems and their electrode pair. It is especially advantageous that an evaluation unit is provided centrally for pressure measurement by several test systems provided with at least one test chamber, and an evaluation unit is provided for impedance measurement, each unit being switchable between the test systems or a single evaluation unit being provided that can be switched between the individual test systems and each of the individual test systems can be switched between pressure measurement and impedance measurement.

The method according to the invention, the test chamber, the test system, and the tester are preferably used for producing liquid content-filled containers with electrically insulating walls, preferably glass or plastic walls, especially containers in the medical field, such as plastic ampoules. At the same time, the method is advantageously performed on several containers forming a set of containers, with leaks in one of these containers or one of these ampoules resulting in nonselective rejection of the entire set.

BRIEF DESCRIPTION OF THE DRAWINGS

The invention will now be described with reference to the figures.

DETAILED DESCRIPTION OF THE INVENTION

Figure 1:
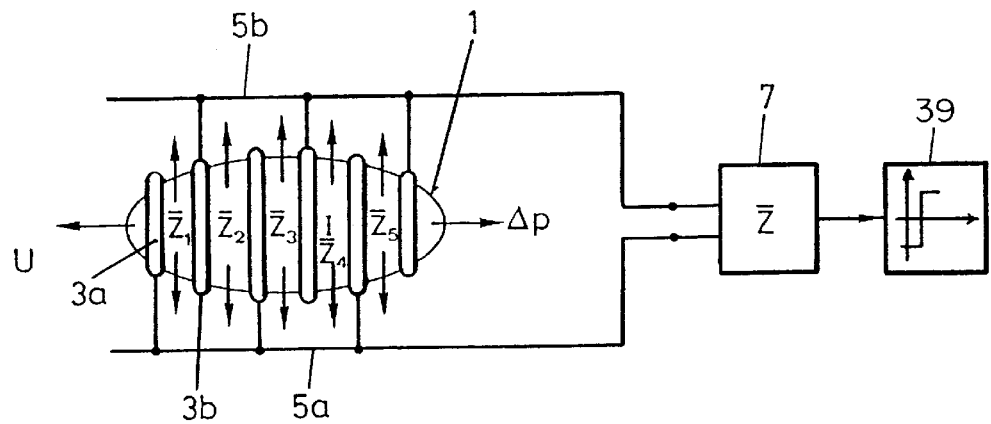
FIG. 1 is a schematic view of a schematic diagram according to the invention, explaining the method according to the invention from its general aspect.

According to FIG. 1, between interior I and the environment U of a container 1 to be tested, a pressure differential $\Delta_p$, is created relative to environment U. In the vicinity of the outside wall of the container, at least one impedance measurement section is provided, with several being provided according to FIG. 1, as indicated by the complex impedances $Z_x$. The impedance measurement sections are each formed between a pair of measuring electrodes 3a and 3b, said electrodes being electrically connected alternately with conductors 5a and 5b as shown schematically. As a result, impedance measuring sections $Z_x$ are connected in parallel between leads 5a and 5b. Tap leads 5a and 5b are connected to an impedance measuring unit 7 whose output acts on a threshold-value-sensitive unit 39. If a leak causes a filling liquid to escape from container I into environment U, at least one of section impedances $Z_x$ changes as a result. The impedance or the change therein is detected by impedance measuring unit 7. If the impedance changes by more than the specified amount as indicated by at least one threshold value on unit 39, the container 1 just tested is considered to be leaking and is discarded.

Although, depending on the application, very complex alternating voltage impedances in impedance measuring sections can be detected and evaluated by means of unit 7, in a far more preferable manner and especially for testing containers with electrically insulating walls and with electrically conducting fillings, impedance measurement is performed as a DC resistance measurement, with impedance measuring unit 7 being actually used as an ohmmeter.

As will be explained later on with reference to FIG. 2, the method explained in principle in FIG. 1, based on impedance measurement, can be combined in a highly optimum fashion, and also with considerable significance for the present invention, with a previously known tightness testing method, considered separately, based on pressure measurement.

Figure 2:
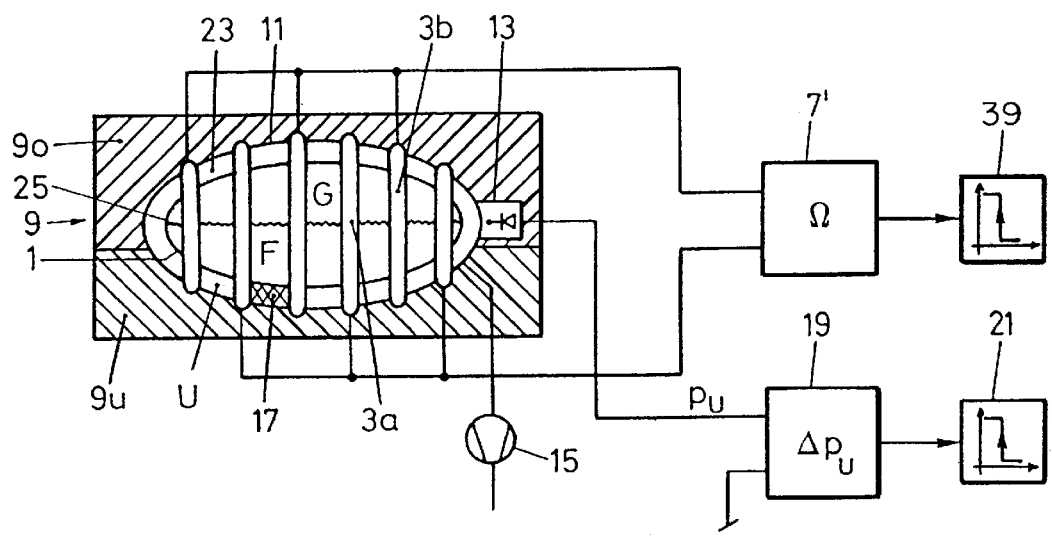
FIG. 2 is a schematic view showing the design of a test chamber and/or test system according to the invention for working the method according to the invention in a greatly preferred embodiment.

According to FIG. 2, a test chamber 9 according to the invention for accommodating container or containers 1, comprises at least two parts, preferably an upper and a lower half, as indicated schematically by $9_o$ and $9_u$. Test chamber 9 together with the container I it contains defines an encapsulated container environment U. On the wall of interior chamber 11 inside the test chamber, a pattern of electrically conducting surfaces is provided that forms electrodes 3b and 3a according to FIG. 1. Of course, electrodes 3a and 3b are separated from one another by insulating wall material. As a result, regular distribution of impedance measurement sections over the entire test chamber interior is preferably provided directly along container 1.

In addition, at least one pressure sensor 13 shown schematically in FIG. 2 is provided that is in an active relationship with the interior of the test chamber. It measures the pressure $P_u$ that prevails in this interior, corresponding to environment U. Following insertion of container 1 to be tested, preferably with an insulating wall, the test chamber is sealed and the pressure differential $\Delta_p$ plotted in FIG. 1 is created by means of a pump 15 for example. Usually the container wall then presses tightly against electrode area 3a and 3b at the inside wall of test chamber 9. If liquid filling F in a wall area of container 1 escapes, as shown schematically at 17, the impedance between the associated electrodes 3a and 3b changes, and this is detected by impedance-measuring unit 7', preferably designed as an ohmmeter. Detection is performed at threshold value unit 39' to determine whether the measured resistance changes by at least a predetermined threshold value. If so, the container just tested is then declared to be leaky. Areas G of the container filled by air inclusions undergo a pressure rise in environment U if a leak is present in these areas, as a result of the pressure equalization between area G and environment U that takes place through the leak. This pressure change is detected by a pressure-measuring unit 19 connected with sensor 13, with the output signal from said unit 19 being fed to another threshold-value-sensitive unit 21. Preferably, the ambient pressure is measured at a first point in time $t_1$ and, after a predetermined time interval, at a later point in time $t_2$, and the resultant pressure differential $\Delta p_u$ is recorded. If this differential falls below a threshold value set on threshold value unit 21, container 1 under test will be deemed to be leaky. The wall of the test chamber interior chamber is then advantageously designed in such fashion that when the pressure differential causes the wall of the container to press against this wall, a continuous ambient space 23 extends around container 1. This is accomplished basically by supports shown individually at 25, which are most preferably produced by roughening inside wall 11. This creates a situation in which, completely independently of where areas G and F are located in the container, tightness is always detected throughout the container. As far as the technology is concerned, in order to ensure that there is a continuous ambient space 23 despite the pressing of the container wall against the inside wall of the chamber, reference is made to EP-A-0 379 986 of the same applicant.

Figure 3:
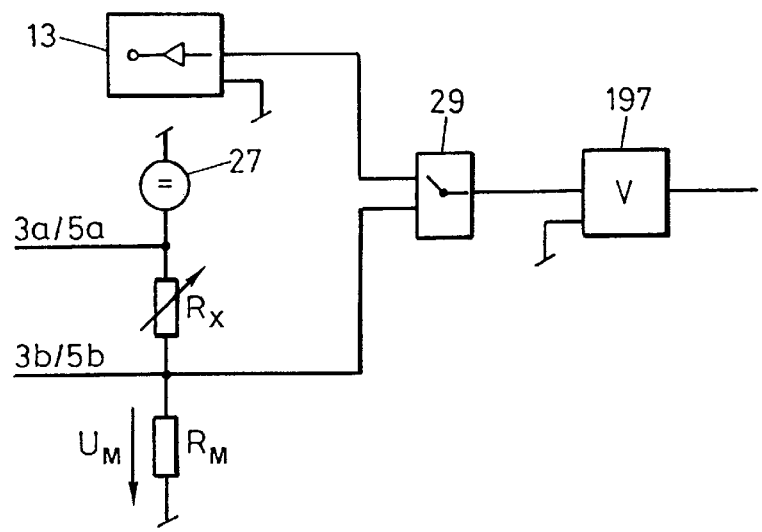
FIG. 3 is a preferred evaluation configuration of the system according to the invention and/or the method according to the invention according to FIG. 2.

While in the embodiment according to FIG. 2 one evaluation unit 7' is provided for impedance measurement and another is provided for pressure differential recording, 19; according to FIG. 3 a single evaluation unit 197 is preferentially provided. Basically, this is made possible by the fact that the same measuring signals are made available for impedance measurement and measurement of the output signal from pressure sensor 13. According to FIG. 3, this can be accomplished for example by connecting measurement sections 3a/5a and 3b/5b corresponding to the resistance to be measured, shown in FIG. 3 as $R_x$ on the one hand with DC voltage source 27, preferably in the low voltage range, for example 15 V, and on the other hand to a measuring resistance $R_M$. The evaluation unit 197, in this case designed as a voltmeter, is alternately switched on the input side by means of a manually or automatically operated switch 29 to the output of sensor 13 and measuring resistance RM. In one case, it measures the output voltage of sensor 13, and in the other case it measures the voltage as a function of Rx at measuring resistances $R_M$, $U_M$.

Figure 4:
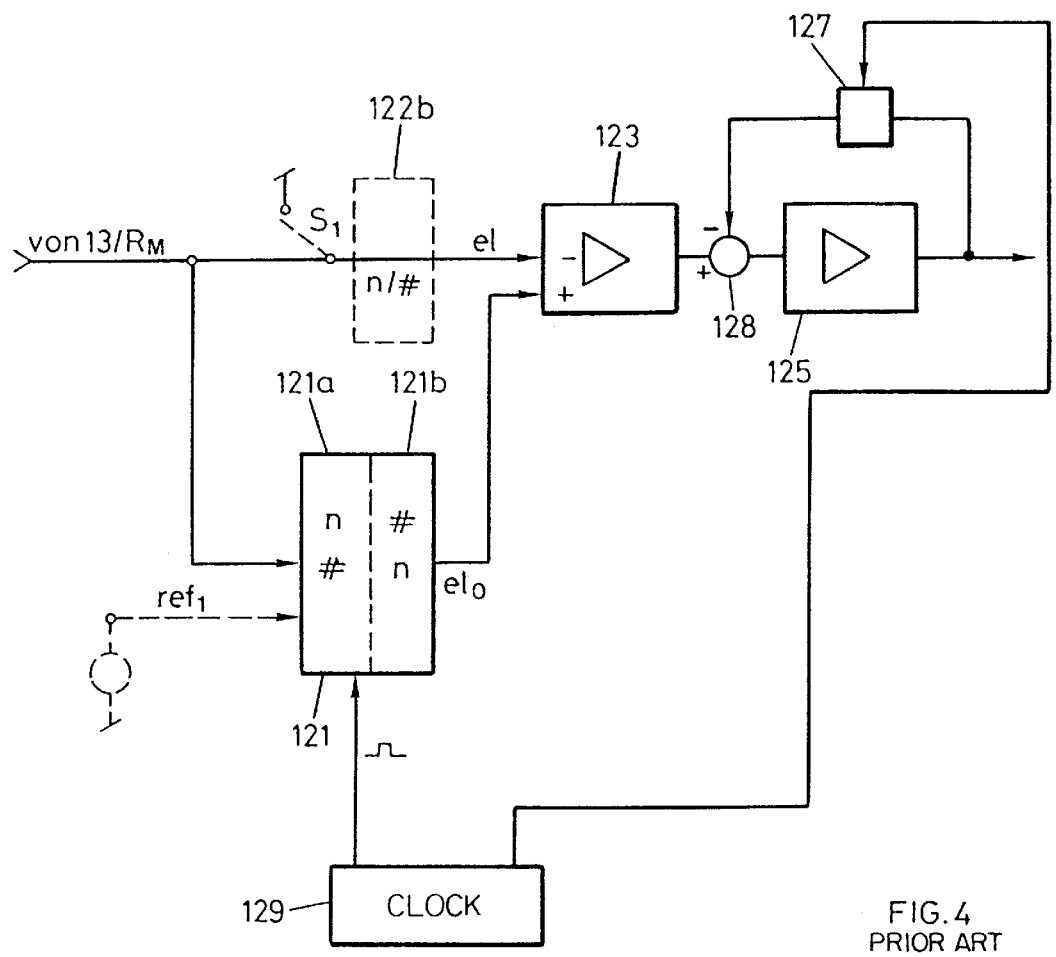
FIG. 4 shows a preferred embodiment of an evaluation unit according to FIG. 3 in the form of a signal flow/function block diagram for processing the output signal from the pressure sensor or from the measuring resistance section.

As far as the pressure-measuring technique employed is concerned, reference is made in full to the abovementioned WO94/05991. The evaluation unit described therein, however, as shown in the present case in FIG. 4, in accordance with the procedure shown in FIG. 3, is also used for highly accurate impedance and/or resistance measurement. The output signal from sensor 13 or from measuring resistance $R_M$, or from the resistance-measuring section in general is supplied to a converter stage 121 that has an analog/digital converter 121a on the input side followed immediately downstream by a digital/analog converter 121b. The output $e1_0$ digital/analog converter 121b is supplied to a differential amplifier unit 123 constructed in known fashion, in the same way as the output signal $e_1$ from the pressure- and resistance-measuring devices 13 and Rm. The output of differential amplifier unit 123 is connected to an additional amplifier stage 125 whose output is superimposed through a storage element 127 on the input signal to amplifier 125, at 128. Converter unit 121, like storage unit 127, is controlled by a clock 129. With this arrangement, pressure differential, impedance differential, and/or resistance differential measurement can be performed. For resistance measurement, at a first point in time, the measuring voltage is applied through converter unit 121 and simultaneously, possibly through an additional converter unit 122b via switch $S_1$, to both inputs of amplifier unit 123: ideally, a zero signal appears on the output side of amplifier 123. If a signal appears that differs from zero, this signal value is stored in storage unit 127 as a zero compensation signal. If the resistance measurement is repeated again at a later point in time to form a resistance differential signal, the value stored previously in storage unit 127 acts as a zero compensation signal and the value stored in unit 121 serves as the reference signal. Thus, a level of amplification that drastically increases resolution can be set on amplifier unit 125. This same zero compensation principle is used in pressure differential measurement at two points in time, as described in detail in WO94/05991. Storage unit 127 is appropriately designed to store both a resistance-differential zero-compensation signal and a pressure-differential zero-compensation signal, with unit 121 being duplicated for storing the assigned reference values. Depending on whether the measurement cycle is measuring pressure or resistance, the assigned compensation signal value is switched to differential unit 128 or the assigned reference signal value is stored and/or switched to the corresponding unit 121 as shown by ref$_1$ in FIG. 4.

Figure 5:
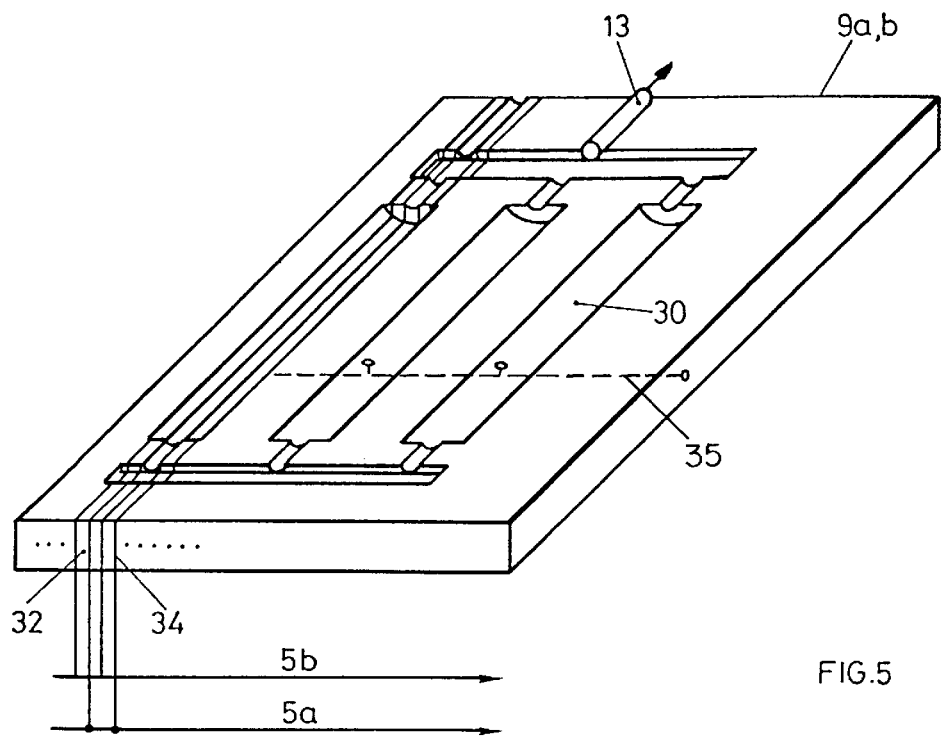
FIG. 5 shows, in a simplified perspective view, an embodiment of the test chamber according to the invention for testing sets of ampoules, with only half of the test chamber according to the invention being shown.

In FIG. 5, in a simplified perspective view, one half 9a or 9b of the test chamber is shown, especially designed for testing sets of ampoules, like those used especially in medical technology. The sets of ampoules are placed in the roughened recess 30 provided for the purpose and then chamber 9 is sealed by applying a second chamber half. As shown, the chamber is composed for example of conducting strips 34 separated with a sealing action from one another by insulating material 32, into which strips recesses 30 are machined. As a result, on the inside walls of recesses 30, a continuous pattern of impedance-measuring electrodes is produced. These electrodes are connected alternately with conducting leads 5a and 5b as shown.

Figure 6:
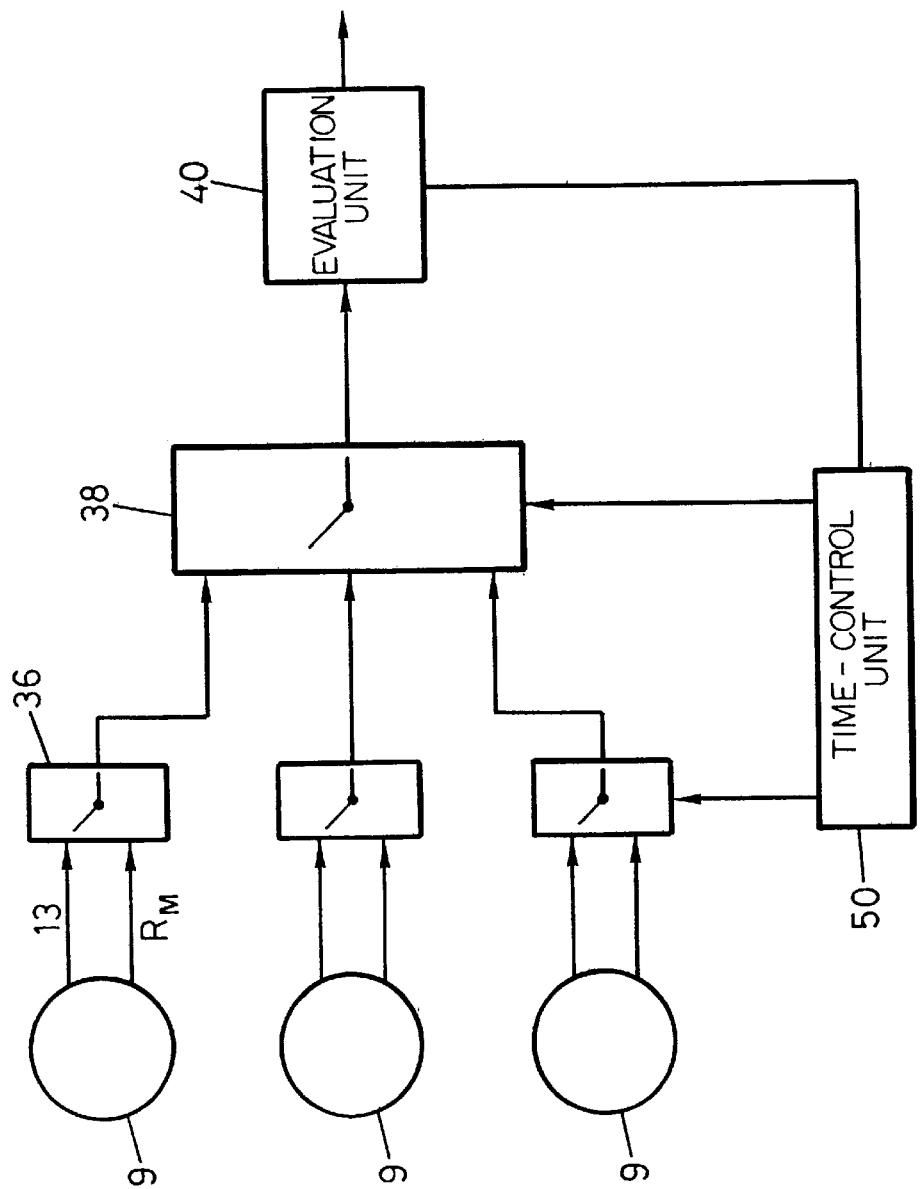
FIG. 6 is a schematic view of a signal flow/function block diagram of a tester according to the invention in the preferred embodiment.

FIG. 6 shows the preferred design of a tester according to the invention with reference to a signal flow functional block diagram as disclosed in the aforementioned U.S. application Ser. No. 08/944,183. It comprises a plurality of test chambers 9, whose pressure sensor and impedance section outputs, marked 13 and Rm in FIG. 6, are each guided to switching units 36. Sequentially, these inputs are connected to one output of units 36, said unit being connected to an actual multiplexer unit 38. On multiplexer unit 38, the inputs supplied by units 36 are preferably selectively connected to an evaluation unit 40 designed as shown for example in FIG. 4. A time-control unit 50 controls the chamber-specific switching cycles—pressure sensor/impedance measurement—and on multiplexer 38, the connection of the individual test chambers 9 to unit 40 that serves as the impedance and pressure evaluation unit. In this way it is possible, optimally with fewer electronic units, to determine the tightness of containers in several test chambers 9 and on the basis of impedance and pressure measurements, i.e. independently of whether liquid-filled or gas-filled volumes are in respective containers 1 and if so, where they are.

In addition, preferably at least one cleaning gas line 35 (FIG. 5) is provided in test chamber 9 to blow out the test chamber and dry it after testing a leaking container.

I claim:

1. A method for producing liquid content-filled containers, comprising the steps of:

filling a liquid filling content into a receptacle to at least partially fill said receptacle with liquid filling content;

sealingly closing the filled receptacle;

snugly enclosing the filled receptacle by the wall surface of a sealingly closable test chamber, said wall surface of said chamber having electrically conducting and electrically isolating surface areas;

producing a pressure differential relative to the environment in the test chamber and the interior of the receptacle and measuring electrical impedance between at least one pair of said electrically conducting surface areas as leakage indication; and freeing the container for further exploitation, if the leakage indication satisfies non-leakage requirements.

2. The method according to claim 1, wherein said producing a pressure differential comprises evacuating said test chamber.

3. The method according to claim 1, wherein said filled receptacle is sealingly closed with air inclusion.

4. The method according to claim 1, wherein said electrically isolating surface areas are portions of an electrically insulating wall of said test chamber.

5. The method according to claim 4, wherein said electrically conducting surface areas of said test chamber are electrically conducting fillings on said electrically insulating wall of said test chamber.

6. The method according to claim 1, including measuring electrical impedance between a plurality of pairs of said electrically conductive surface areas as leakage indication.

7. The method according to claim 1, wherein said receptacle has an electrically insulating wall and said liquid filling content is electrically conductive.

8. The method according to claim 1, wherein said receptacle has a glass or plastic wall.

9. The method according to claim 1, wherein said receptacle is a plastic ampoule.

10. The method according to claim 1, wherein said measuring electrical impedance comprises measuring DC resistance between said pairs.

11. The method according to claim 1, further comprising the step of grouping said electrically conducting surface areas to at least two respective measuring tabs and measuring electric impedance between said at least two tabs.

12. The method according to claim 1, further comprising the step of measuring pressure in the space between said wall-surface of said chamber and the outer wall of said receptacle as an additional leakage indication.

13. The method according to claim 1, wherein said measuring electric impedance includes the step of measuring said electric impedance by an impedance measuring unit at a first point of time and at at least a second point of time, thereby exploiting electric impedance difference of said electric impedance measured at said at least two points in time as said leakage indication.

14. The method according to claim 13, further comprising the step of automatically offsetting said measuring unit at said first point of time to result in a zero-output signal at this first point in time.

15. The method according to claim 1, including providing said electrically conducting and electrically isolating surface areas of said wall by constructing said chamber of a sandwiched material of electrically conductive and electrically isolating material layers.

16. The method according to claim 1, further comprising the step of testing more than one receptacle in one and the same test chamber.

17. The method according to claim 1, wherein said receptacle is formed by a composite receptacle consisting of a multitude of separately closed sub-receptacles.

18. The method according to claim 1, wherein said receptacle is a receptacle with a plastic material wall.

19. The method according to claim 1, wherein said receptacle is at least one ampoule or a set of inter-linked ampoules.

* * * * *